US012694060B2

(12) United States Patent
Peng

(10) Patent No.: US 12,694,060 B2
(45) Date of Patent: Jul. 28, 2026

(54) STORAGE METHOD FOR GRAPH DATA AND DISTRIBUTED COMPUTING METHOD FOR GRAPH DATA

(71) Applicant: Alipay (Hangzhou) Information Technology Co., Ltd., Hangzhou (CN)

(72) Inventor: Yi Peng, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/300,812

(22) Filed: Apr. 14, 2023

(65) Prior Publication Data

US 2023/0334095 A1    Oct. 19, 2023

(30) Foreign Application Priority Data

Apr. 15, 2022    (CN) .......................... 202210392590.1

(51) Int. Cl.
*G06F 16/901* (2019.01)
*G06F 16/906* (2019.01)

(52) U.S. Cl.
CPC ........ *G06F 16/9024* (2019.01); *G06F 16/906* (2019.01)

(58) Field of Classification Search
CPC ........................... G06F 16/9024; G06F 16/906
See application file for complete search history.

(56) References Cited

U.S. PATENT DOCUMENTS

| | | | |
|---|---|---|---|
| 10,372,807 B1* | 8/2019 | Greenbaum | ............ G06F 40/18 |
| 2014/0207509 A1* | 7/2014 | Yu | ....................... G06Q 10/1093 |
| | | | 705/7.19 |
| 2016/0337366 A1* | 11/2016 | Wright | .................... G06F 40/18 |

(Continued)

FOREIGN PATENT DOCUMENTS

| | | |
|---|---|---|
| CN | 109086391 A | 12/2018 |
| CN | 110472068 A | 11/2019 |

(Continued)

OTHER PUBLICATIONS

D. Wang, W. Cui and B. Qin, "Graph Compression Storage Based on Spatial Cluster Entity Optimization," inÂ IEEE Access, vol. 8, pp. 29075-29088, 2020, doi: 10.1109/ACCESS.2020.2971639.

(Continued)

*Primary Examiner* — Courtney Harmon
(74) *Attorney, Agent, or Firm* — Seed IP Law Group LLP

(57) ABSTRACT

The present specification relates to the field of data processing, and in particular, to a storage method for graph data and a distributed computing method for graph data. The graph data includes nodes and edges, the nodes include entity nodes and non-entity nodes, and the storage method for the graph data includes: obtaining a first table and a second table based on the graph data; obtaining first sub-tables and second sub-tables respectively corresponding to a plurality of entity node groups; and distributing the first sub-tables and the second sub-tables corresponding to the entity node groups to a plurality of computing units for distributed storage. In the distributed computing method for the graph data, the graph data is stored in a plurality of computing units in a distributed way according to the storage method for the graph data, and the method can be executed by one of the computing units.

20 Claims, 7 Drawing Sheets

(56) References Cited

U.S. PATENT DOCUMENTS

| | | | |
|---|---|---|---|
| 2018/0232458 A1 | 8/2018 | Fitzgerald et al. | |
| 2019/0340271 A1 * | 11/2019 | Faulhaber | G06F 16/2433 |
| 2020/0012734 A1 * | 1/2020 | Lee | G06F 16/2379 |
| 2022/0327119 A1 * | 10/2022 | Gasper | G06F 16/9024 |

FOREIGN PATENT DOCUMENTS

| | | | |
|---|---|---|---|
| CN | 110619055 A | 12/2019 |
| CN | 110795562 A | 2/2020 |
| CN | 111241301 A | 6/2020 |
| CN | 111460047 A | 7/2020 |
| CN | 113220835 A | 8/2021 |
| CN | 113239186 A | 8/2021 |
| CN | 113434737 A | 9/2021 |
| CN | 113486187 A | 10/2021 |
| CN | 113961528 A | 1/2022 |
| CN | 114282011 A | 4/2022 |
| CN | 114328905 A | 4/2022 |
| CN | 114996478 A | 9/2022 |

OTHER PUBLICATIONS

Guocheng Zhu, "Design and Implementation of Knowledge Graph Storage Access System Based on Big Data Platform," Southeast University-Monash University Joint Graduate School, Southeast University, May 2018, 63 pages.

* cited by examiner

100

Obtain a first table and a second table
based on graph data
110

Obtain first sub-tables and second sub-
tables respectively corresponding to a
plurality of entity node groups
120

Distribute the first sub-tables and the
second sub-tables corresponding to the
entity node groups to a plurality of
computing units for distributed storage
130

| Group identifier | Node type | Business field | City |
|---|---|---|---|
| Shop A | Shop | Catering | Chengdu |
| Ticket A | Voucher | Clothing | Shanghai |
| Ticket B | Voucher | Catering | Chengdu |
| Shop B | Shop | Clothing | Shanghai |
| Ticket C | Voucher | Catering | Chengdu |
| Ticket D | Voucher | Catering | Shanghai |

FIG. 2

| O | P | S |
|---|---|---|
| Shanghai | Voucher_city | Ticket A |
| Shanghai | Voucher_city | Ticket D |
| Shanghai | City_city | Shop B |
| Chengdu | Shop_city | Shop A |
| Chengdu | Voucher_city | Ticket B |
| Chengdu | Voucher_city | Ticket C |
| Clothing | Voucher_business field | Ticket A |
| Clothing | Shop_business field | Shop B |
| Catering | Shop_business field | Shop A |
| Catering | Voucher_business field | Ticket B |
| Catering | Voucher_business field | Ticket C |
| Catering | Voucher_business field | Ticket D |

Figure 5:
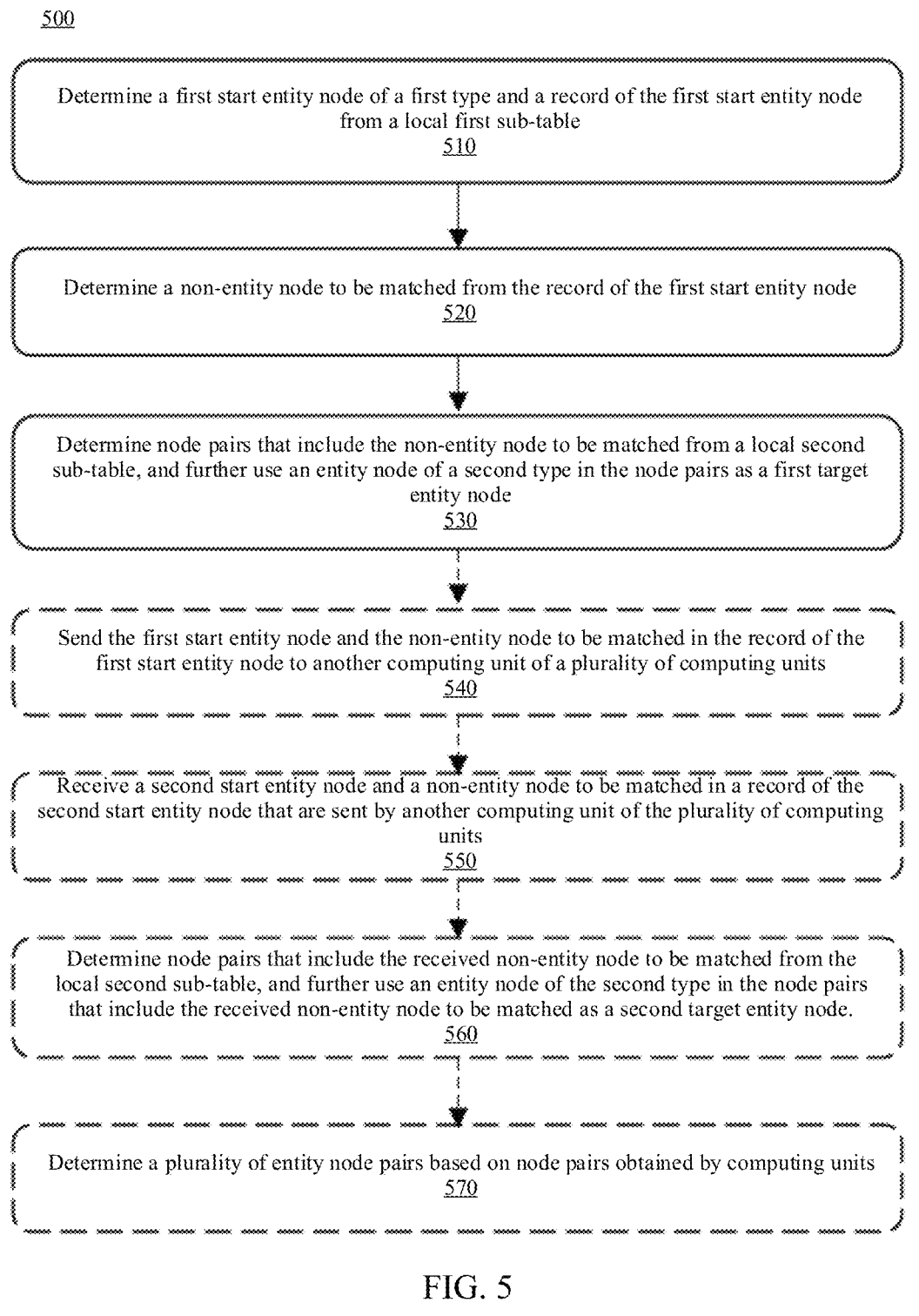

Determine a first start entity node of a first type and a record of the first start entity node
from a local first sub-table
510

Determine a non-entity node to be matched from the record of the first start entity node
520

Determine node pairs that include the non-entity node to be matched from a local second
sub-table, and further use an entity node of a second type in the node pairs as a first target
entity node
530

Send the first start entity node and the non-entity node to be matched in the record of the
first start entity node to another computing unit of a plurality of computing units
540

Receive a second start entity node and a non-entity node to be matched in a record of the
second start entity node that are sent by another computing unit of the plurality of computing
units
550

Determine node pairs that include the received non-entity node to be matched from the
local second sub-table, and further use an entity node of the second type in the node pairs
that include the received non-entity node to be matched as a second target entity node.
560

Determine a plurality of entity node pairs based on node pairs obtained by computing units
570

Table acquisition
module
710

Grouping module
720

Distribution
module
730

800

First start node determining
module
810

Non-entity node determining
module
820

First target entity node
determining module
830

STORAGE METHOD FOR GRAPH DATA AND DISTRIBUTED COMPUTING METHOD FOR GRAPH DATA

TECHNICAL FIELD

The present specification relates to the field of data processing, and in particular, to a storage method for graph data and a distributed computing method for graph data.

BACKGROUND

A knowledge graph is a structured data representation that can efficiently present knowledge information contained in data. However, a large amount of data in the knowledge graph needs to be stored, and a data storage method determines an effect achieved during subsequent graph computing or other further processing.

SUMMARY

One of implementations of the present specification provides a storage method for graph data. The graph data includes nodes and edges, the nodes include entity nodes and non-entity nodes, and the method includes: obtaining a first table and a second table based on the graph data, where the first table includes records of the entity nodes, a record of each entity node includes information about a non-entity node associated with the entity node, the second table includes information about a plurality of node pairs, and each node pair includes a non-entity node and an entity node associated with the non-entity node; obtaining first sub-tables and second sub-tables respectively corresponding to a plurality of entity node groups, where the plurality of entity node groups are a plurality of groups obtained by grouping the entity nodes, a first sub-table corresponding to an entity node group includes records in the first table of entity nodes of the entity node group, and a second sub-table corresponding to the entity node group includes information in the second table about node pairs that include the entity nodes of the entity node group; and distributing the first sub-tables and the second sub-tables corresponding to the entity node groups to a plurality of computing units for distributed storage.

One of the implementations of the present specification provides a storage system for graph data. The graph data includes nodes and edges, the nodes include entity nodes and non-entity nodes, and the system includes: a table acquisition module, configured to obtain a first table and a second table based on the graph data, where the first table includes records of the entity nodes, a record of each entity node includes information about a non-entity node associated with the entity node, the second table includes information about a plurality of node pairs, and each node pair includes a non-entity node and an entity node associated with the non-entity node; a grouping module, configured to obtain first sub-tables and second sub-tables respectively corresponding to a plurality of entity node groups, where the plurality of entity node groups are a plurality of groups obtained by grouping the entity nodes, a first sub-table corresponding to an entity node group includes records in the first table of entity nodes of the entity node group, and a second sub-table corresponding to the entity node group includes information in the second table about node pairs that include the entity nodes of the entity node group; and a distribution module, configured to distribute the first sub-tables and the second sub-tables corresponding to the entity node groups to a plurality of computing units for distributed storage.

One of the implementations of the present specification provides a storage apparatus for graph data, including at least one storage medium and at least one processor. The at least one storage medium is configured to store computer instructions, and the at least one processor is configured to execute the computer instructions to implement the above method.

One of the implementations of the present specification provides a distributed computing method for graph data. The graph data is stored in a plurality of computing units in a distributed way according to the above storage method for the graph data, and the method can be performed by one of the computing units and includes: determining a first start entity node of a first type and a record of the first start entity node from a local first sub-table; determining a non-entity node to be matched from the record of the first start entity node; and determining node pairs that include the non-entity node to be matched from a local second sub-table, and further using an entity node of a second type in the node pairs as a first target entity node.

One of the implementations of the present specification provides a distributed computing system for graph data. The graph data is stored in a plurality of computing units in a distributed way according to the above storage method for the graph data, and the system is disposed in one of the computing units and includes: a first start node determining module, configured to determine a first start entity node of a first type and a record of the first start entity node from a local first sub-table; a non-entity node determining module, configured to determine a non-entity node to be matched from the record of the first start entity node; and a first target entity node determining module, configured to determine node pairs that include the non-entity node to be matched from a local second sub-table, and further use an entity node of a second type in the node pairs as a first target entity node.

One of the implementations of the present specification provides a distributed computing apparatus for graph data, including at least one storage medium and at least one processor. The at least one storage medium is configured to store computer instructions, and the at least one processor is configured to execute the computer instructions to implement the above method.

One of the implementations of the present specification provides a distributed storage apparatus for graph data, storing first sub-tables and second sub-tables of the graph data, where the graph data includes nodes and edges, and the nodes include entity nodes and non-entity nodes; the first sub-table includes records of a part of the entity nodes in the graph data, and a record of each entity node includes information about a non-entity node associated with the entity node; and the second sub-table includes information about node pairs that include entity nodes of the part of the entity nodes, and each node pair includes a non-entity node and an entity node associated with the non-entity node.

BRIEF DESCRIPTION OF DRAWINGS

The present specification is further described by using example implementations, and the example implementations are described in detail by using the accompanying drawings. These implementations constitute no limitation, and in these implementations, same numbers indicate same structures.

FIG. 2 is a schematic diagram illustrating a first table according to some implementations of the present specification;

FIG. 3 is a schematic diagram illustrating a second table according to some implementations of the present specification;

FIG. 5 is an example flowchart illustrating a distributed computing method for graph data according to some implementations of the present specification;

DESCRIPTION OF IMPLEMENTATIONS

Figure 1:
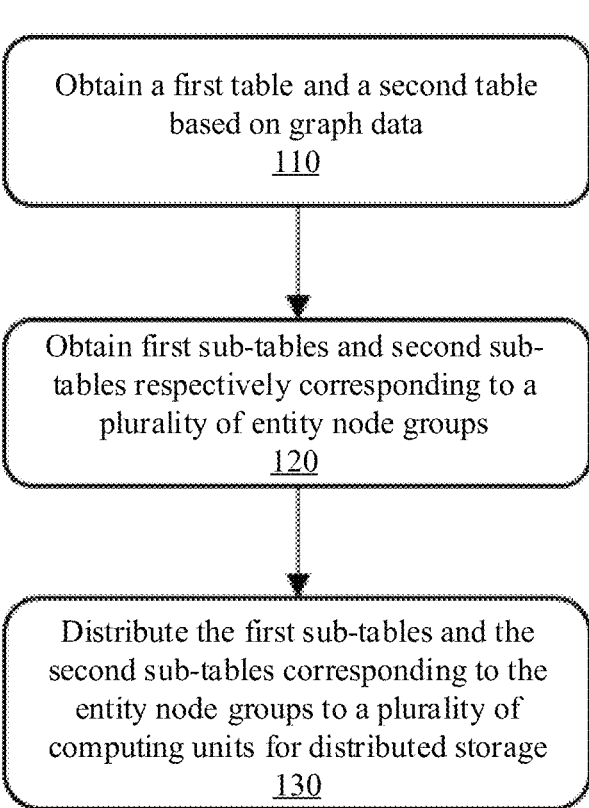
FIG. 1 is an example flowchart illustrating a storage method for graph data according to some implementations of the present specification.

To describe the technical solutions of the implementations of the present specification more clearly, the following briefly describes the accompanying drawings required for describing the implementations. Clearly, the accompanying drawings in the following descriptions merely illustrate some examples or implementations of the present specification. A person of ordinary skill in the art can further apply the present specification to other similar scenarios without making innovative efforts. Unless otherwise clear from the context or otherwise described, same reference numerals in the figures represent same structures or operations.

It should be understood that "system," "apparatus," "unit," and/or "module" used herein are/is a method for distinguishing between different components, elements, parts, or assemblies of different levels. However, if other words can achieve the same purpose, the words can be replaced with other expressions.

As described in the present specification and claims, unless the context clearly indicates an exception, the words such as "a", "an", and/or "the" do not specifically indicate singular, and can alternatively indicate plural. Generally, the terms "comprise" and "include" only give a prompt that clearly identified steps and elements are included. These steps and elements do not constitute an exclusive list, and the method or the device can include other steps or elements.

The flowchart is used in the present specification to describe the operations performed by the system according to the implementations of the present specification. It should be understood that preceding or following operations are not necessarily precisely performed in order. Instead, the steps can be processed in reverse order or simultaneously. In addition, other operations can be added to these processes, or one or several operations can be removed from these processes.

A knowledge graph is also referred to as graph data or a semantic network and is a knowledge base or a network including nodes and edges. In some implementations, the node can correspond to an entity such as objects, events, situations, or concepts. The entity can be a tangible object in the physical or real world, such as a person, an automobile, or a merchant, or can be an intangible object, such as discourse, a song, a movie, a fund, or program code. There can be relationships between entities, and the relationships between the entities can be referred to as fact relationships, corresponding to edges between the entity nodes. For example, merchant A has business transactions with merchant B, merchant C is a sub-merchant of merchant A, Zhang San is a manager of merchant A, and Zhang San is a friend of Li Si. In some implementations, the node can correspond to a non-entity, for example, an abstract concept or an attribute such as a nationality, a gender, a brand, or a region. There can also be relationships between entity nodes and non-entity nodes, and the relationships between the entity nodes and the non-entity nodes can be referred to as semantic relationships, corresponding to edges between the entity nodes and the non-entity nodes. For example, a relationship between Zhang San (an entity node) and a brand (a non-entity node) is preference, Li Si (an entity node) has a nationality of China (a non-entity node), and Wang Wu (an entity node) has a gender of male (a non-entity node). In some implementations, a knowledge graph that includes non-entity nodes can also be referred to as a semantic relationship graph. Compared with a knowledge graph that includes only entity nodes, the semantic relationship graph has a more obvious characteristic that there are more hot spots in the semantic relationship graph. This is because semantic relationships are denser than fact relationships. In other words, the non-entity node generally corresponds to concept or attribute information, and a large quantity of entity nodes can be connected to the non-entity node by using edges, making the non-entity node easily become a hot spot.

This graph data may be stored in a graph database and visualized as a graph structure. In storage and computing of the knowledge graph, hot spots occupy a large amount of storage resources and computing resources, resulting in bottlenecks in computing devices. Even in a distributed storage scenario, uneven hot spot distribution results in bottlenecks in some computing devices in a distributed cluster.

Some implementations of the present specification provide a storage method for graph data, which avoids centralized distribution of hot spots in some computing devices by storing the graph data after grouping. In addition, some implementations of the present specification further provide a distributed computing method for graph data for performing efficient computing on the graph data stored by using the storage method for the graph data.

FIG. 1 is an example flowchart illustrating a storage method for graph data according to some implementations of the present specification.

In some implementations, the graph data can be a semantic knowledge graph, including entity nodes and non-entity nodes. The graph data can be stored by using process 100. In some implementations, process 100 can be performed by a computing device, or can be performed by a central server in a graph computing cluster or one of computing units that perform graph computing tasks in parallel. The process 100 can include the following steps.

Step 110: Obtain a first table and a second table based on the graph data. In some implementations, step 110 can be performed by table acquisition module 710.

In some implementations, the first table includes records of the entity nodes, and a record of each entity node includes information about a non-entity node associated with the entity node. Association can mean having an edge connection. In some implementations, the information about the non-entity node in the record can be an identifier or a name of the non-entity node.

FIG. 2 illustrates an example of the first table, where "shop A", "ticket A", etc. are entity nodes in the graph data. The ticket can be a valuable ticket such as a coupon or a voucher. One row in the table is a record of an entity node. The first row in the table is a record of an entity node "shop A", including non-entity node information "catering" indicating a business type and non-entity node information "Chengdu" indicating city affiliation that are associated with the entity node. The second row in the table is a record of an entity node "ticket A", and non-entity nodes associated with the entity node include non-entity node information "clothing" indicating a business type and non-entity node information "Shanghai" indicating a city.

In some implementations, the first table further includes information related to types (Label) of the entity nodes. For example, in FIG. 2, the record of "shop A" further includes a type of "shop A": "shop", and the record of "ticket A" further includes a type of "ticket A": "voucher".

In some implementations, the second table includes information about a plurality of node pairs, and each node pair includes a non-entity node and an entity node associated with the non-entity node. In some implementations, the information about the node pair can be identifiers or names of two nodes (a non-entity node and an entity node) in the node pair. In some implementations, the information about the node pair can further include a relationship type (edge information) between the two nodes in the node pair, etc. For example, a name of the non-entity node can be Chengdu, Shanghai, or catering, and an identifier of the non-entity node can be CD, SHOP, or ORDER.

FIG. 3 shows an example of the second table, where one row corresponds to one node pair. For example, in the first row, "Shanghai" is an identifier or a name of a non-entity node, "ticket A" is an identifier or a name of an entity node, and "voucher-city" is a relationship type to reflect that the node pair indicates a relationship between the ticket and the city. In some implementations, the second table includes all non-entity node—entity node pairs having edge connections in the graph data. If the non-entity node "Chengdu" in the graph data only has edge connections to entity nodes "shop A", "ticket B", and "ticket C", respectively, the second table includes three node pairs: "Chengdu—shop A," "Chengdu—ticket B," and "Chengdu—ticket C."

Step 120: Obtain first sub-tables and second sub-tables respectively corresponding to a plurality of entity node groups. In some implementations, step 120 can be performed by grouping module 720.

In some implementations, the plurality of entity node groups are a plurality of groups obtained by grouping the entity nodes in the graph data. The quantity of entity node groups can be determined based on the quantity of computing devices that store the graph data in a distributed way. In some implementations, quantities of entity nodes in the groups can be equal or determined based on quantities of node pairs in the second sub-tables corresponding to the entity node groups, so that the quantities of node pairs in the second sub-tables corresponding the groups are balanced.

In some implementations, a first sub-table corresponding to an entity node group includes records in the first table of entity nodes of the entity node group, and a second sub-table corresponding to the entity node group includes information in the second table about node pairs that include the entity nodes of the entity node group.

For example, "shop A", "ticket A", and "ticket B" can be placed in an entity node group. As shown in FIG. 2, records (the rows 1 to 3 in the first table) corresponding to the three entity nodes "shop A", "ticket A", and "ticket B" in the first table are used as a first sub-table corresponding to the entity node group. In addition, as shown in FIG. 3, information (the rows 1, 4, 5, 7, 9, and 10 in the second table) about six node pairs that include the three entity nodes "shop A", "ticket A", and "ticket B" are used as a second sub-table corresponding to the group. For a specific division method, references can be made to the following related descriptions.

In some implementations, to facilitate subsequent distribution and storage, group identifiers can be added to entity nodes in different entity node groups. Still in the above example, in the first table or the second table, an identifier "1" can be added in front of the three entity nodes "shop A", "ticket A", and "ticket B" to indicate that the three entity nodes belong to a same entity node group, and an identifier "2" can be added in front of three entity nodes "shop B", "ticket C", and "ticket D" to indicate that the three entity nodes belong to another entity node group. It should be noted that the identifier can be an order identifier or a random identifier. In some implementations, the identifier can be referred to as a subject identifier (Subject ID).

In some implementations, in step 120, the first sub-tables and the second sub-tables can be obtained by performing division or grouping based on in an entity node dimension or an entity node pair (second table) dimension. In some implementations, when division is performed in the entity node dimension, step 120 can include: equally dividing the entity nodes into the plurality of entity node groups, e.g., each of the plurality of entity node group includes a same or similar number of entity nodes; and for each entity node group, extracting records corresponding to entity nodes of the entity node group from the first table to obtain a first sub-table corresponding to the entity node group, and extracting information about node pairs that include the entity nodes of the entity node group from the second table to obtain a second sub-table corresponding to the entity node group.

In some implementations, the quantity of entity nodes in the entity node group can be determined by grouping the total quantity of entity nodes in the graph data by the quantity of entity node groups. For example, each entity node group is controlled to include 50, 100, 200, 1000, or other quantities of entity nodes.

For example, as shown in FIG. 2, each entity node group can be controlled to include three entities. Therefore, three entity nodes "shop A", "ticket A", and "ticket B" are used as an entity node group, and records corresponding to the three entity nodes can be extracted to obtain a first sub-table corresponding to the entity node group. Information (the rows 1, 4, 5, 7, 9, and 10 in the second table) about node pairs that include the three entity nodes "shop A", "ticket A", and "ticket B" are extracted from the second table to obtain a second sub-table corresponding to the entity node group.

In some implementations, the information about the node pairs in the second sub-table can be stored in order based on non-entity nodes. In some implementations, ordered storage can be storage performed in order (for example, ascending order or descending order) based on attributes, names, or identifiers of the non-entity nodes or storage performed according to a predetermined rule. For more content about ordered storage of the information about the node pairs, references can be made to related descriptions of FIG. 5.

In some implementations, when division is performed in the entity node pair (second table) dimension, step 120 can include: grouping the second table to obtain a plurality of second sub-tables, where information about node pairs that include a same entity node is placed in a same second sub-table so that the plurality of entity node groups can be obtained through second sub-table division, and it can be considered that each second sub-table corresponds to an entity node group; and for each second sub-table, extracting records corresponding to entity nodes of an entity node group corresponding to the second sub-table from the first table to obtain a corresponding first sub-table.

In some implementations, the second table can be divided to obtain a predetermined quantity of second sub-tables (for example, 20, 50, 100, or 200 second sub-tables). The predetermined quantity can be determined based on the quantity of computing devices that store the graph data in a distributed way. For example, the quantity of second sub-tables can be equal to the quantity of computing devices or can be a multiple of a data amount of the computing device. In some implementations, while it is ensured that information about node pairs of a same entity node is in a same second sub-table, the quantity of node pairs in the second sub-table further needs to be considered, so that amounts of entity node pair information in the plurality of second sub-tables obtained through division are balanced. It should be noted that, during practical division, it may not be ensured that the amounts of entity node pair information in the second sub-tables are completely consistent. Therefore, amount balancing can indicate amount equality, indicate that an amount difference does not exceed a predetermined value, etc. In some implementations, the predetermined value can be 20, 50, 100, or 5% or 10% of the amount of node pair information in the second sub-table.

For example, as shown in FIG. 3, every six entity node pairs in the second table can be used as one second sub-table. It is easy to learn that entity nodes in the rows 1, 4, 5, 7, 9, and 10 in the second table include three entity nodes "shop A", "ticket A", and "ticket B", and the three entity nodes are used as an entity node group. Then, records corresponding to the three entity nodes "shop A", "ticket A", and "ticket B" are extracted from the first table to obtain a first sub-table.

In some implementations, when division is performed in the entity node pair (second table) dimension, it can be ensured that information about node pairs of a same entity node is in a same second sub-table, and groups can also be adjusted based on the quantity of node pairs, so that the amounts of node pair information included in the second sub-tables are balanced. Because the amounts of information in the second sub-tables are balanced, when the semantic graph data is stored in a distributed way, amounts of sub graph data in computing devices can be more balanced, to effectively avoid hot spot aggregation in some computing devices.

Step 130: Distribute the first sub-tables and the second sub-tables corresponding to the entity node groups to a plurality of computing units for distributed storage. In some implementations, step 130 can be performed by distribution module 730.

In some implementations, the computing unit can include various computing devices having information transceiver functions, such as a smartphone, a laptop computer, a desktop computer, and a server. In some implementations, the server can be an independent server or a server group. The server group can be centralized or distributed. In some implementations, the server can be regional or remote. In some implementations, the server can be executed on a cloud platform. For example, the cloud platform can include one or any combination of a private cloud, a public cloud, a hybrid cloud, a community cloud, a distributed cloud, an internal cloud, etc.

Figure 4:
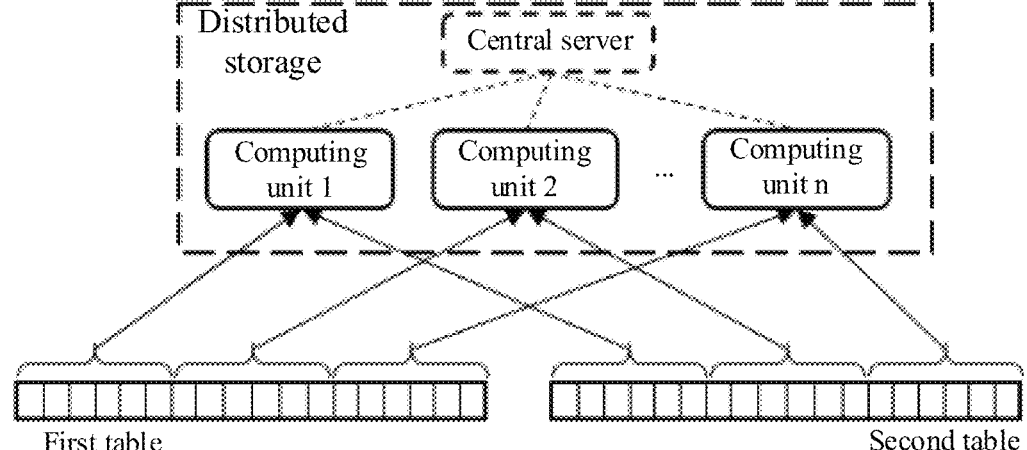
FIG. 4 is a schematic diagram illustrating distributed storage according to some implementations of the present specification.

Referring to FIG. 4, in some implementations, when the first sub-tables and the second sub-tables corresponding to the entity node groups are distributed to the plurality of computing units, a first sub-table and a second sub-table corresponding to a same entity node group can be distributed to a same computing unit or can be distributed to different nodes. For example, a certain computing unit can include a first sub-table corresponding to a first entity node group and a second sub-table corresponding to a second entity node group. It can be understood that when the first table and the second table are stored in a distributed way after being divided into the plurality of first sub-tables and the plurality of second sub-tables, regardless of the distribution method described above, hot spot occurrence in the computing unit can be alleviated to a specific extent.

In some implementations, the quantity of any sub-tables can be controlled to approximate to a multiple of the quantity of computing units during first sub-table or second sub-table division. For example, assuming that a total of seven computing units perform storage, and entity node group division is performed in the second table dimension, in step 120, the second table can be divided into about 7, 14, 70, or 350 second sub-tables, and corresponding first sub-tables can be obtained.

In some implementations, one first sub-table or second sub-table can be sent to one computing unit at one time, so that all the sub-tables are distributed to the plurality of computing units in order. If the quantity of any sub-tables is greater than the quantity of computing units, the above distribution operation is repeatedly performed on remaining sub-tables until all the remaining sub-tables are distributed to the computing units.

In some scenarios, query or computing need to be performed on the graph data stored in a distributed way by using process 100. For example, a querier hopes to determine a relationship between a voucher and a shop based on the graph data. Both the shop and the voucher are entity nodes in the graph data, and the graph data includes relationships between the voucher and the shop and non-entity nodes: a brand and a city. Therefore, all shops and vouchers associated with a same brand and a same city are queried by using computing tasks, to mine relationships between tickets and stores for binding. In some implementations, for example, a relationship between a user and a merchant can be mined based on the graph data, to recommend the merchant to the user. For a specific mining process, references can be made to the process in FIG. 5.

FIG. 5 is an example flowchart illustrating a distributed computing method for graph data according to some implementations of the present specification.

Process 500 in FIG. 5 provides a distributed computing method for graph data. The graph data is stored in a plurality of computing units in a distributed way according to the method in process 100.

In some implementations, one or more steps in process 500 can be performed by any computing unit (for example, computing unit 1 in FIG. 6) participating in distributed storage. Process 500 includes the following steps.

Step 510: Determine a first start entity node of a first type and a record of the first start entity node from a local first sub-table. In some implementations, step 510 can be performed by first start node determining module 810.

Still in the example in process 100, a type of an entity node includes a shop (Shop) and a voucher (Order). Assuming that the shop is used as the first type, computing unit 1 in FIG. 6 can determine "shop A" from a local first sub-table of computing unit 1 as a first start entity node and determine a record of the entity node.

In some implementations, different first types can be selected based on different practical scenarios. For example, when a relationship between a user and a merchant needs to be mined, the first type can be the merchant.

Step 520: Determine a non-entity node to be matched from the record of the first start entity node. In some implementations, step 520 can be performed by non-entity node determining module 820.

Still in the above example, when a relationship between a ticket and a shop needs to be mined for binding, types of non-entity nodes to be matched can include a city (City) and a business field (Brand), and it can be determined, based on a record of "shop A" in the first sub-table, that the non-entity nodes to be matched can include "catering" and "Chengdu". It should be noted that in some implementations, a type of a non-entity node to be matched can include only a city (City) or a business field (Brand).

In some implementations, other non-entity nodes can be included based on different practical scenarios. For example, when a relationship between a user and a merchant needs to be mined, a type of a non-entity node to be matched can include one or more of a city or a commodity attribute. The commodity attribute can be information describing the commodity attribute, such as a commodity category (Chinese food, Western food, Sichuan food, Cantonese food, barbecue, hot pot, etc.), a commodity color (red, blue, black, etc.), or a commodity shape.

Step 530: Determine node pairs that include the non-entity node to be matched from a local second sub-table, and further use an entity node of a second type in the node pairs as a first target entity node. In some implementations, step 530 can be performed by first target entity node determining module 830.

Figure 6:
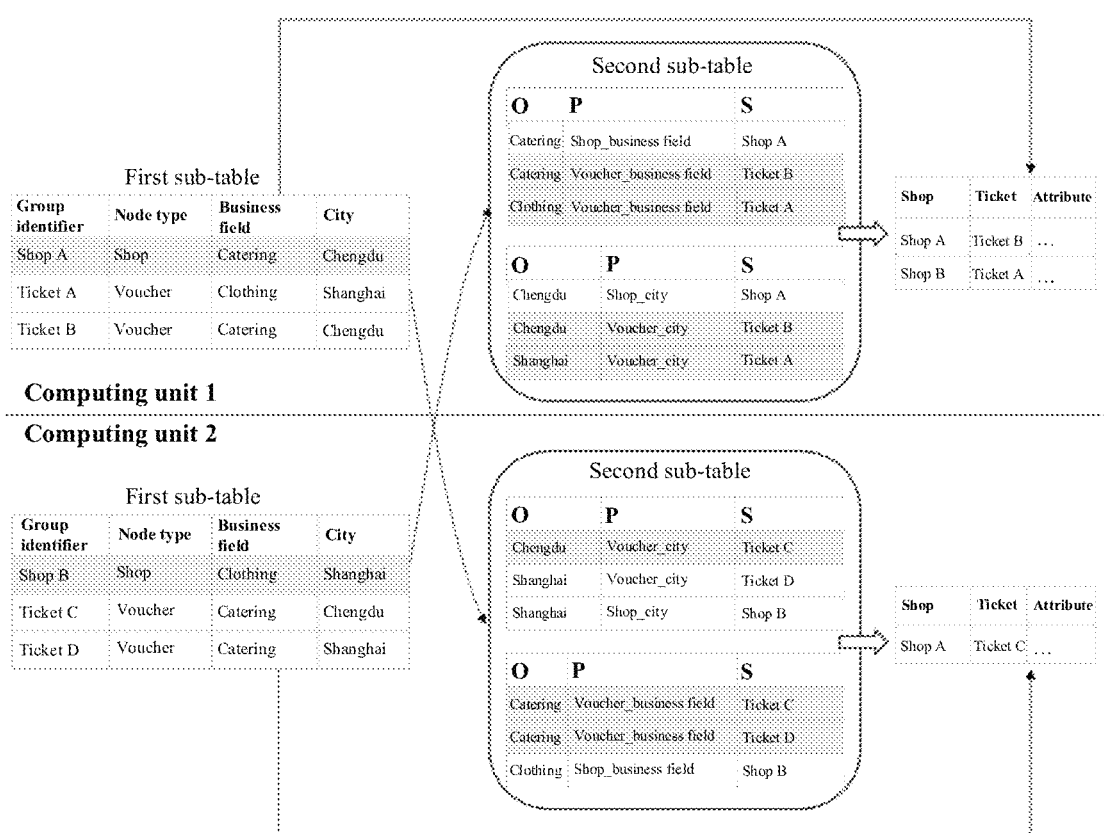
FIG. 6 is a schematic diagram illustrating distributed computing of graph data according to some implementations of the present specification.

Still in the example in FIG. 6, the second type is an entity node type different from the first type, for example, can be a voucher. Node pairs that include "catering" and "Chengdu" are determined from a local second sub-table. Two node pairs "catering—ticket B" and "Chengdu—ticket B" are included, so that it can be determined that the entity node "ticket B" is a first target entity node. It should be noted that in some implementations, the first type and the second type can be interchanged, and the first type can be the same as the second type based on a practical application scenario.

As shown in FIG. 6, in some implementations, information about node pairs in the local second sub-table of the computing unit is stored in partitions based on types of non-entity nodes, and information about node pairs in each partition is stored in order based on names or identifiers of non-entity nodes. In the figure, node pairs of a city type and node pairs of a business field type are stored in partitions. When a practical computing task (for example, step 530) is performed, when a non-entity node to be matched is "Chengdu", the node pairs of the business type in the second sub-table do not need to be queried, thereby improving query efficiency. In some implementations, a partition of a physical storage region or a logical partition can be used for partition storage.

In some implementations, ordered storage is performed in each partition based on names or identifiers (for example, Pinyin initials) of non-entity nodes. For example, "clothing" can be ranked behind "catering". For example, "catering" can be queried from the second sub-table. Because "catering" is centrally stored in a partition, query can be stopped when the last node pair corresponding to "catering" is obtained, thereby further improving query efficiency.

In some implementations, because the graph data is stored in a distributed way, and a second sub-table locally held by another computing unit of the plurality of computing units can include the non-entity node to be matched of the locally queried first start entity node, process 500 further includes the following step:

Step 540: Send the first start entity node and the non-entity node to be matched in the record of the first start entity node to another computing unit of the plurality of computing units.

Still in the above example, "shop A" and the non-entity nodes "catering" and "Chengdu" to be matched in the record of "shop A" are sent to another node (for example, computing unit 2 in FIG. 6). Other nodes can obtain the first target entity node corresponding to the first start entity node according to step 530. For example, after computing unit 2 in FIG. 6 receives the first start entity node "shop A" and the non-entity nodes "catering" and "Chengdu" to be matched in the record of "shop A" that are sent from computing unit 1, computing unit 2 can locally determine that an entity node "ticket C" and an entity node "ticket D" are second target entity nodes.

In some implementations, another node can obtain another start entity node (for example, a second start entity node) according to steps 510 and 520, and a local second sub-table may include information about a non-entity node to be matched of another start entity node (for example, the second start entity node), process 500 further includes the following steps:

Step 550: Receive a second start entity node and a non-entity node to be matched in a record of the second start entity node that are sent by another computing unit of the plurality of computing units.

Step 560: Determine node pairs that include the received non-entity node to be matched from the local second sub-table, and further use an entity node of the second type in the node pairs that include the received non-entity node to be matched as a second target entity node.

As shown in FIG. 6, computing unit 1 can receive a second start entity node "shop B" and non-entity nodes "clothing" and "Shanghai" to be matched in a record of the second start entity node "shop B" that are sent from computing unit 2.

Computing unit 1 determines node pairs "clothing—ticket A" and "Shanghai—ticket A" that include the non-entity nodes to be matched from the local second sub-table, and then obtains a second target entity node "ticket A".

In some implementations, a plurality of second start entity nodes can be included. For example, second start entity nodes determined by more computing units such as computing unit 3 are included.

In some implementations, after completing one time of query, computing units send query results to a central server or a computing unit (for example, computing unit 1), to aggregate the results of the computing units to determine a final computing result. The query results can be node pairs queried by the computing units from second sub-tables. Therefore, process 500 further includes the following step:

Step 570: Determine a plurality of entity node pairs based on the node pairs obtained by the computing units, where the plurality of entity node pairs include an entity node of the first type and an entity node of the second type that have a same non-entity node to be matched.

Still in the above example, node pairs "catering—ticket B", "Chengdu—ticket B", "clothing—ticket A", and "Shanghai—ticket A" obtained by computing unit 1 through local query and node pairs "Chengdu—ticket C", "catering—ticket C", "catering ticket D", and "Shanghai—ticket D" obtained by computing unit 2 through query are intersected (assuming that entity node pairs with a same city and a same business type need to be find). Finally, entity node pairs "shop A—ticket B" and "shop A—ticket C" are obtained, that is, a relationship between a voucher and a shop is mined. In some implementations, to bind the voucher to the shop, process 500 can further include: binding the entity node of the first type in the entity node pairs to the entity node of the second type. For example, ticket A and ticket C are bound to shop A. Then, consumers can shop in shop A by using ticket A and ticket C.

It can be learned that in a process of performing a computing task in process 500, after only one round of data exchange is performed between the computing units, query is completed, that is, entity node pairs are obtained, thereby greatly reducing a data transmission amount and computing time, and improving computing efficiency.

Similarly, if a relationship between a user and a merchant needs to be mined, entity node pairs can include entity nodes (users) of a first type and entity nodes (merchants) of a second type that have same non-entity nodes (same city and commodity attribute) to be matched. In some implementations, to make a recommendation to the user, the distributed computing method for the graph data can further include recommending the entity node of the first type in the entity node pairs to the entity node of the second type.

It should be noted that the above descriptions of process 100 and process 500 are merely for purposes of illustration and description, and constitute no limitation to the applicability scope of the present specification. For a person skilled in the art, various modifications and changes can be made to process 500 under the guidance of the present specification. However, such modifications and changes still fall within the scope of the present specification. For example, step 540 may be performed after step 560, or in some scenarios, some computing units may not perform steps 550 to 570.

Figure 7:
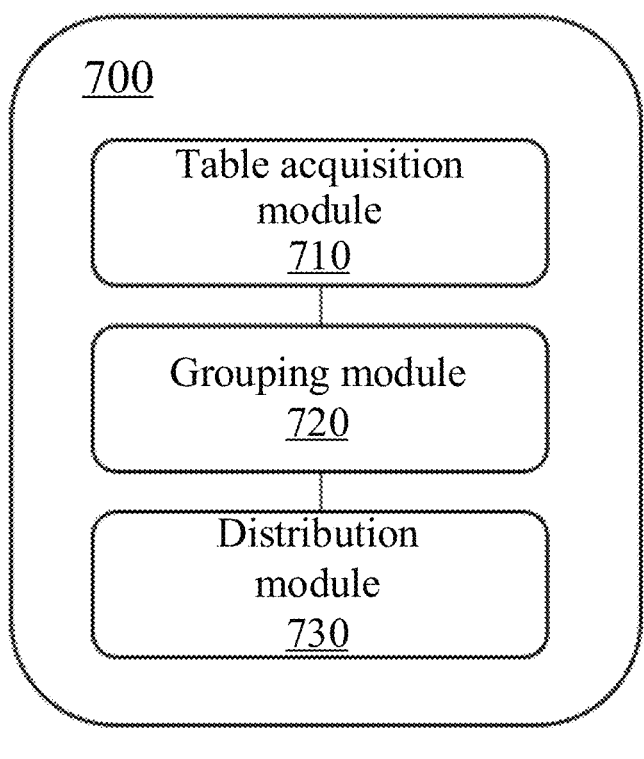
FIG. 7 is an example module diagram illustrating a storage system for graph data according to some implementations of the present specification.

FIG. 7 is an example module diagram illustrating a storage system for graph data according to some implementations of the present specification.

As shown in FIG. 7, storage system 700 for graph data includes table acquisition module 710, grouping module 720, and distribution module 730.

Table acquisition module 710 can be configured to obtain a first table and a second table based on the graph data, where the first table includes records of entity nodes, a record of each entity node includes information about a non-entity node associated with the entity node, the second table includes information about a plurality of node pairs, and each node pair includes a non-entity node and an entity node associated with the non-entity nod.

In some implementations, for more descriptions of the first table and the second table, references can be made to the related descriptions of step 110. Details are omitted herein for simplicity.

Grouping module 720 can be configured to obtain first sub-tables and second sub-tables respectively corresponding to a plurality of entity node groups, where the plurality of entity node groups are a plurality of groups obtained by grouping the entity nodes, a first sub-table corresponding to an entity node group includes records in the first table of entity nodes of the entity node group, and a second sub-table corresponding to the entity node group includes information in the second table about node pairs that include the entity nodes of the entity node group.

In some implementations, for more descriptions of the first sub-table and the second sub-table, references can be made to the related descriptions of step 120. Details are omitted herein for simplicity.

Distribution module 730 can be configured to distribute the first sub-tables and the second sub-tables corresponding to the entity node groups to a plurality of computing units for distributed storage.

In some implementations, for more descriptions of distributed storage, references can be made to the related descriptions of step 130. Details are omitted herein for simplicity.

Figure 8:
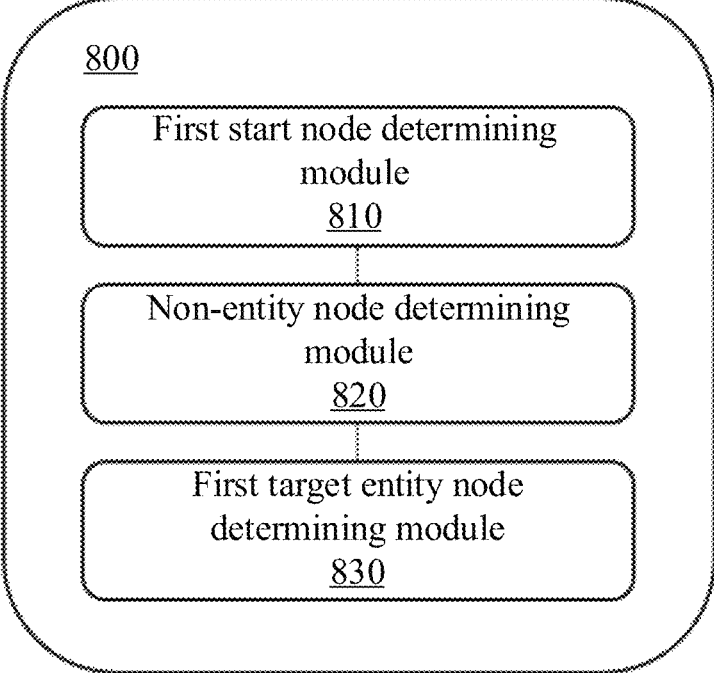
FIG. 8 is an example module diagram illustrating a distributed computing system for graph data according to some implementations of the present specification.

FIG. 8 is an example module diagram illustrating a distributed computing system for graph data according to some implementations of the present specification.

As shown in FIG. 8, distributed computing system 800 for graph data includes first start node determining module 810, non-entity node determining module 820, and first target entity node determining module 830.

First start node determining module 810 can be configured to determine a first start entity node of a first type and a record of the first start entity node from a local first sub-table.

In some implementations, for more descriptions of the first start entity node and the record of the first start entity node, references can be made to the related descriptions of step 510. Details are omitted herein for simplicity.

Non-entity node determining module 820 may be configured to determine a non-entity node to be matched from the record of the first start entity node.

In some implementations, for more descriptions of the non-entity node to be matched, references can be made to the related descriptions of step 520. Details are omitted herein for simplicity.

First target entity node determining module 830 can be configured to determine node pairs that include the non-entity node to be matched from a local second sub-table, and further use an entity node of a second type in the node pairs as a first target entity node.

In some implementations, for more descriptions of the first target entity node, references can be made to the related descriptions of step 530. Details are omitted herein for simplicity.

It should be noted that the above descriptions of system 700 and system 800 and the modules of system 700 and system 800 are merely for ease of description, and cannot limit the present specification within the scope of the illustrated implementations. It can be understood that, after understanding the principle of the system, a person skilled in the art may arbitrarily combine the modules or form a subsystem to connect to other modules without departing from this principle. For example, in some implementations, for example, table acquisition module 710, grouping module 720, and distribution module 730 disclosed in FIG. 7 can be different modules in one system, or one module can implement functions of two or more of the above modules. For example, the modules can share a storage module, or the modules can have respective storage modules. Such variations fall within the protection scope of the present specification.

Technically beneficial effects that can be brought by the implementations of the present specification include but are not limited to the following: (1) Graph data is stored after grouping, to avoid hot spot occurrence in a computing unit, thereby avoiding a computing bottleneck in subsequent computing and ensuring graph computing efficiency. (2) The graph data is converted into a first table and a second table, the first table and the second table are divided to obtain first sub-tables and second sub-tables, and the first sub-tables and the second sub-tables are stored in a plurality of computing units in a distributed way, thereby effectively reducing an amount of communication between the computing units.

It should be noted that different implementations can generate different technically beneficial effects. Technically beneficial effects possibly generated in different implementations can be any one or a combination of the above beneficial effects, or can be any other beneficial effects possibly obtained.

The basic concept has been described above. It is clear for a person skilled in the art that, the above detailed disclosure is merely used as an example and constitutes no limitation to the present specification. Although not clearly described herein, a person skilled in the art may make various modifications, improvements, and corrections to the present specification. Such modifications, improvements, and corrections are suggested in the present specification, so that such modifications, improvements, and corrections still fall within the spirit and scope of the example implementations of the present specification.

In addition, the present specification describes the implementations of the present specification by using specific words, such as "one implementation," "an implementation," and/or "some implementations", meaning a certain feature, structure, or characteristic associated with at least one implementation of the present specification. Therefore, it should be emphasized and noted that "an implementation", "one implementation", or "an alternative implementation" mentioned in the present specification two or more times at different locations does not necessarily indicate a same implementation. In addition, certain features, structures, or characteristics in one or more implementations of the present specification can be appropriately combined.

In addition, unless clearly and specifically described, the order of the processing elements and sequences in the present specification, the use of numbers or letters, or the use of other names is not intended to limit the orders of the processes and methods in the present specification. While some implementations of the present invention that are presently believed to be useful are discussed in the above disclosure by using various examples, it should be understood that such details are merely for illustrative purposes, and the appended claims are not limited to the disclosed implementations; on the contrary, the claims are intended to cover all modifications and equivalent combinations that fall within the essence and scope of the implementations of the present specification. For example, although the system components described above can be implemented by a hardware device, the system components can be implemented only by using software solutions. For example, the described system is installed on an existing server or mobile device.

It should be noted that, to simplify the expressions disclosed in the present specification to help understand one or more implementations of the present invention, in the above descriptions of the implementations of the present specification, sometimes a plurality of features may be combined into one implementation, drawing, or description of the features. However, the disclosure method does not mean that the subject matter of the present specification requires more features than those mentioned in the claims. In practice, the features of the implementations are less than all the features of the individual implementations disclosed above.

Numbers describing the quantities of components and attributes are used in some implementations. It should be understood that such numbers used to describe implementations are modified by using a modifier "about," "approximately," or "substantially" in some examples. Unless otherwise described, "about", "approximately", or "substantially" indicates that a change of ±20% is allowed for the numbers. Correspondingly, in some implementations, value parameters used in the specification and claims are approximations. The approximations can change based on desired characteristics of individual implementations. In some implementations, for the value parameters, specified significant digits should be considered and a general digit reservation method should be used. Although value ranges and parameters used in some implementations of the present specification to determine the breadth of the scope of the implementations are approximations, in specific implementations, such values are set as precisely as possible in a practicable scope.

Each patent, patent application, patent application publication, and other materials such as articles, books, specifications, publications, and documents cited for the present specification are incorporated herein as reference in their entireties, except for historical application documents inconsistent with or in conflict with the content of the present specification and documents (currently or later appended to the present specification) that constitute a limitation to the broadest scope of the claims in the present specification. It should be noted that if there is any inconsistency or conflict between use of the descriptions, definitions, and/or terms in materials appended to the present specification and the content of the present specification, use of the descriptions, definitions, and/or terms in the present specification shall prevail.

Finally, it should be understood that the implementations described in the present specification are merely used to describe the principles of the implementations of the present specification. Other variations may also fall within the scope of the present specification. Therefore, by way of example rather than limitation, it can be considered that alternative configurations of the implementations of the present specification are consistent with the teachings of the present specification. Correspondingly, the implementations of the present specification are not limited to the implementations clearly described in the present specification.

What is claimed is:

1. A method comprises:

obtaining a first table and a second table based on semantic graph data, wherein the semantic graph data includes nodes and edges, the nodes include entity nodes and non-entity nodes, the first table includes records of the entity nodes, a record of each entity node includes information about a non-entity node associated with the entity node, the second table includes information about a plurality of node pairs, and each node pair includes a non-entity node and an entity node associated with the non-entity node;

obtaining first sub-tables and second sub-tables respectively corresponding to a plurality of entity node groups, wherein the plurality of entity node groups are a plurality of groups obtained by grouping the entity nodes, a first sub-table corresponding to an entity node group includes records in the first table of entity nodes of the entity node group, and a second sub-table corresponding to the entity node group includes information in the second table about node pairs that include the entity nodes of the entity node group, wherein the second sub-tables include balanced amounts of node pair information; and distributing the first sub-tables and the second sub-tables corresponding to the entity node groups to a plurality of computing units for distributed storage, wherein a first sub-table and a second sub-table corresponding to a same entity node group are distributed to a same computing unit, and wherein one first sub-table or second sub-table is sent to one of the plurality of computing units at a time, and all of the first or second sub-tables are distributed to the plurality of computing units one-by-one in time order.

2. The method according to claim 1, wherein the obtaining the first sub-tables and the second sub-tables respectively corresponding to the plurality of entity node groups includes:

grouping the entity nodes into the plurality of entity node groups with equal number of entity nodes in each entity node group; and for each entity node group, extracting records corresponding to entity nodes of the entity node group from the first table to obtain a first sub-table corresponding to the entity node group, and extracting information about node pairs that include the entity nodes of the entity node group from the second table to obtain a second sub-table corresponding to the entity node group.

3. The method according to claim 1, wherein the obtaining the first sub-tables and the second sub-tables respectively corresponding to the plurality of entity node groups includes:

dividing the second table to obtain the second sub-tables, wherein information about node pairs that include a same entity node is placed in a same second sub-table; and for each second sub-table, extracting records corresponding to entity nodes of an entity node group corresponding to the second sub-table from the first table to obtain a corresponding first sub-table.

4. The method according to claim 1, wherein the information about the node pairs in the second sub-table is stored in order based on non-entity nodes.

5. The method according to claim 4, wherein the information about the node pairs in the second sub-table is stored in partitions based on types of the non-entity nodes, and information about node pairs in each partition is stored in order based on names or identifiers of non-entity nodes.

6. The method according to claim 1, wherein the information about the node pair includes names or identifiers of a non-entity node and an entity node of the node pair, and a type of a relationship between the two nodes.

7. The method according to claim 1, further comprising:

by a first computing unit of the computing units, determining a first start entity node of a first type and a record of the first start entity node from a local first sub-table;

determining a first non-entity node to be matched from the record of the first start entity node; and determining node pairs including the first non-entity node to be matched from a local second sub-table, and further using an entity node of a second type in the node pairs as a first target entity node.

8. The method according to claim 7, further comprising: sending the first start entity node and the first non-entity node to be matched in the record of the first start entity node to another computing unit of the plurality of computing units.

9. The method according to claim 7, further comprising: receiving a second start entity node and a second non-entity node to be matched in a record of the second start entity node that are sent by a second computing unit of the plurality of computing units; and determining node pairs that include the second non-entity node to be matched from the local second sub-table, and further using an entity node of the second type in the node pairs that include the second non-entity node to be matched as a second target entity node.

10. The method according to claim 9, further comprising: determining a plurality of entity node pairs based on node pairs determined by the computing units, wherein the plurality of entity node pairs include an entity node of the first type and an entity node of the second type that have a same non-entity node to be matched.

11. The method according to claim 10, wherein the first type is a shop, the second type is a voucher, and a type of the non-entity node to be matched includes one or more of a city or a business field; and the method further comprises: binding the entity node of the first type in the entity node pairs to the entity node of the second type; or wherein the first type is a merchant, the second type is a user, and a type of the non-entity node to be matched includes one or more of a city or a commodity attribute; and the method further comprises: recommending the entity node of the first type in the entity node pairs to the entity node of the second type.

12. A computing system comprising one or more processors and one or more memory device having executable instructions stored thereon, the executable instruction, when executed by the one or more processors, enabling the one or more processors to implement acts including:

obtaining a first table and a second table based on semantic graph data, wherein the semantic graph data includes nodes and edges, the nodes include entity nodes and non-entity nodes, the first table includes records of the entity nodes, a record of each entity node includes information about a non-entity node associated with the entity node, the second table includes information about a plurality of node pairs, and each node pair includes a non-entity node and an entity node associated with the non-entity node;

obtaining first sub-tables and second sub-tables respectively corresponding to a plurality of entity node groups, wherein the plurality of entity node groups are a plurality of groups obtained by grouping the entity nodes, a first sub-table corresponding to an entity node group includes records in the first table of entity nodes of the entity node group, and a second sub-table corresponding to the entity node group includes information in the second table about node pairs that include the entity nodes of the entity node group, wherein the second sub-tables include balanced amounts of node pair information; and distributing the first sub-tables and the second sub-tables corresponding to the entity node groups to a plurality of computing units for distributed storage, wherein a first sub-table and a second sub-table corresponding to a same entity node group are distributed to a same computing unit, and wherein one first sub-table or second sub-table is sent to one of the plurality of computing units at a time, and all of the first or second sub-tables are distributed to the plurality of computing units one-by-one in time order.

13. The computing system according to claim 12, wherein the obtaining the first sub-tables and the second sub-tables respectively corresponding to the plurality of entity node groups includes:

grouping the entity nodes into the plurality of entity node groups with equal number of entity nodes in each entity node group; and for each entity node group, extracting records corresponding to entity nodes of the entity node group from the first table to obtain a first sub-table corresponding to the entity node group, and extracting information about node pairs that include the entity nodes of the entity node group from the second table to obtain a second sub-table corresponding to the entity node group.

14. The computing system according to claim 12, wherein the obtaining the first sub-tables and the second sub-tables respectively corresponding to the plurality of entity node groups includes:

dividing the second table to obtain the second sub-tables, wherein information about node pairs that include a same entity node is placed in a same second sub-table; and for each second sub-table, extracting records corresponding to entity nodes of an entity node group corresponding to the second sub-table from the first table to obtain a corresponding first sub-table.

15. The computing system according to claim 12, wherein the information about the node pairs in the second sub-table is stored in order based on non-entity nodes.

16. The computing system according to claim 15, wherein the information about the node pairs in the second sub-table is stored in partitions based on types of the non-entity nodes, and information about node pairs in each partition is stored in order based on names or identifiers of non-entity nodes.

17. A non-transitory storage medium having executable instructions stored thereon, which when executed by one or more processors enable the one or more processor to implement acts comprising:

obtaining a first table and a second table based on semantic graph data, wherein the semantic graph data includes nodes and edges, the nodes include entity nodes and non-entity nodes, the first table includes records of the entity nodes, a record of each entity node includes information about a non-entity node associated with the entity node, the second table includes information about a plurality of node pairs, and each node pair includes a non-entity node and an entity node associated with the non-entity node;

obtaining first sub-tables and second sub-tables respectively corresponding to a plurality of entity node groups, wherein the plurality of entity node groups are a plurality of groups obtained by grouping the entity nodes, a first sub-table corresponding to an entity node group includes records in the first table of entity nodes of the entity node group, and a second sub-table corresponding to the entity node group includes information in the second table about node pairs that include the entity nodes of the entity node group, wherein the second sub-tables include balanced amounts of node pair information; and distributing the first sub-tables and the second sub-tables corresponding to the entity node groups to a plurality of computing units for distributed storage, wherein a first sub-table and a second sub-table corresponding to a same entity node group are distributed to a same computing unit, and wherein one first sub-table or second sub-table is sent to one of the plurality of computing units at a time, and all of the first or second sub-tables are distributed to the plurality of computing units one-by-one in time order.

18. The storage medium according to claim 17, wherein the obtaining the first sub-tables and the second sub-tables respectively corresponding to the plurality of entity node groups includes:

grouping the entity nodes into the plurality of entity node groups with equal number of entity nodes in each entity node group; and for each entity node group, extracting records corresponding to entity nodes of the entity node group from the first table to obtain a first sub-table corresponding to the entity node group, and extracting information about node pairs that include the entity nodes of the entity node group from the second table to obtain a second sub-table corresponding to the entity node group.

19. The storage medium according to claim 17, wherein the obtaining the first sub-tables and the second sub-tables respectively corresponding to the plurality of entity node groups includes:

dividing the second table to obtain the second sub-tables, wherein information about node pairs that include a same entity node is placed in a same second sub-table; and for each second sub-table, extracting records corresponding to entity nodes of an entity node group corresponding to the second sub-table from the first table to obtain a corresponding first sub-table.

20. The storage medium according to claim 17, wherein the information about the node pairs in the second sub-table is stored in order based on non-entity nodes.

* * * * *